United States Patent [19]

Blenkush

[11] Patent Number: 4,541,457
[45] Date of Patent: Sep. 17, 1985

[54] TWO-WAY UNCOUPLING VALVE ASSEMBLY

[75] Inventor: Brian J. Blenkush, Maple Grove, Minn.

[73] Assignee: Colder Products Company, St. Paul, Minn.

[21] Appl. No.: 583,117

[22] Filed: Feb. 24, 1984

Related U.S. Application Data

[63] Continuation-in-part of Ser. No. 455,202, Jan. 3, 1983, abandoned, which is a continuation-in-part of Ser. No. 359,071, Mar. 17, 1982, Pat. No. 4,436,125.

[51] Int. Cl.⁴ ............................................. F16L 37/08
[52] U.S. Cl. ........................ 137/614.06; 137/614.05; 251/149.9; 285/317; 285/DIG. 25
[58] Field of Search ................ 137/614.06, 614.05; 251/149.9, 149.8, 89.5; 285/317, 307, DIG. 25

[56] References Cited

U.S. PATENT DOCUMENTS

| | | | |
|---|---|---|---|
| 1,248,705 | 12/1917 | Pogue | 251/149.1 |
| 2,102,774 | 12/1937 | Williams | 285/317 |
| 2,263,293 | 11/1941 | Ewald | 251/149.6 |
| 2,771,308 | 11/1956 | Vitcha et al. | 285/317 |
| 3,334,860 | 8/1967 | Bolton, Jr. | 251/149.1 |
| 3,391,951 | 7/1968 | Miller | 285/3 |
| 3,479,005 | 11/1969 | De Graaf | 251/149.9 |
| 3,583,667 | 6/1971 | Amneus | 251/149.5 |
| 3,825,222 | 7/1974 | Petrova | 251/149.6 |
| 4,012,059 | 3/1977 | Luke et al. | 285/317 |
| 4,025,049 | 5/1977 | Schmidt | 251/149.6 |
| 4,116,476 | 9/1978 | Porter et al. | 285/317 |
| 4,338,933 | 7/1982 | Bayard et al. | 251/149.1 |
| 4,366,945 | 1/1983 | Bläuenstein | 285/DIG. 25 |
| 4,442,863 | 4/1984 | Majorien | 251/149.8 |

FOREIGN PATENT DOCUMENTS

| | | | |
|---|---|---|---|
| 738173 | 7/1966 | Canada . | |
| 2731525 | 1/1978 | Fed. Rep. of Germany | 285/317 |

OTHER PUBLICATIONS

Catalog, "Thermo Plastic and Chrome Plated Quick Couplings and Components for Flexible Tubing", No. 781, Colder Products Company.

Brochure, "Thermo Plastic Quick Couplings for Flexible Tubing", No. 382C, Colder Products Company.

*Primary Examiner*—A. Michael Chambers
*Attorney, Agent, or Firm*—Merchant, Gould, Smith, Edell, Welter & Schmidt

[57] ABSTRACT

A two-way uncoupling valve assembly (300) is disclosed. The two-way uncoupling valve assembly (300) includes a male coupling member (306) and a female coupling member (308). The female coupling member (308) includes a two-way valve assembly (304) and a locking mechanism (302) for cooperating with the male coupling member (306) to retain the two-way uncoupling valve assembly (300) and to enable the two-way uncoupling valve assembly (300) to be shut off or turned on. In addition, the two-way uncoupling valve assembly (300) includes a threaded nut (318) which cooperates with a threaded collar portion (336) to enable threaded connection of the male coupling member (306) to the female coupling member (308). Accordingly, the present invention provides in a single mechanism a two-way valve assembly along with a quick disconnect, connect feature.

18 Claims, 31 Drawing Figures

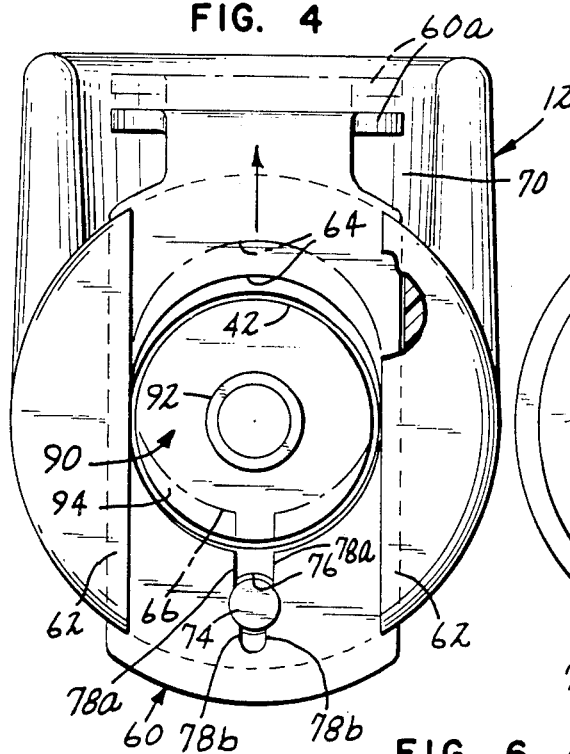
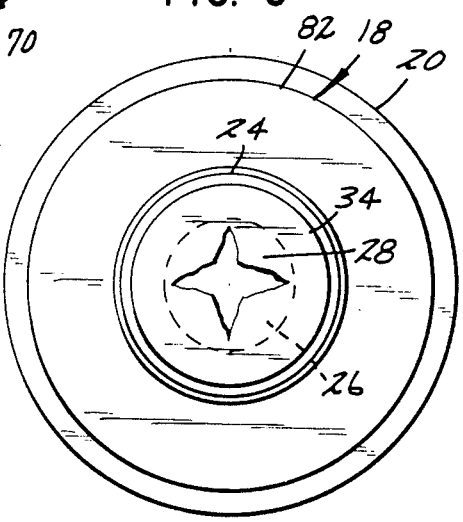
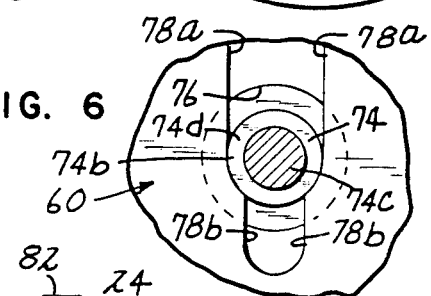
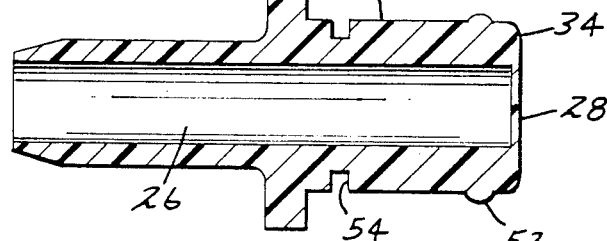
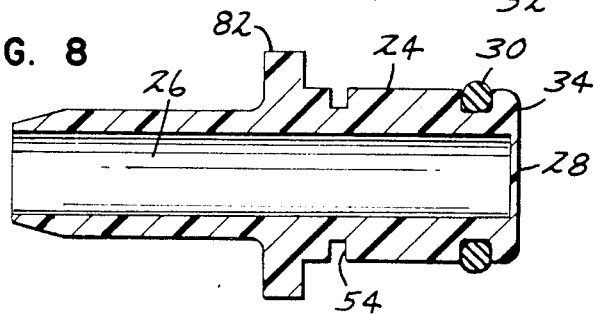

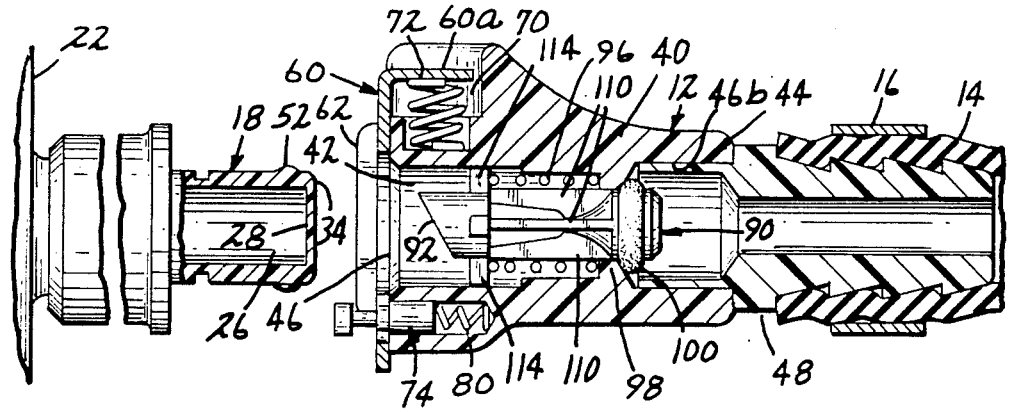
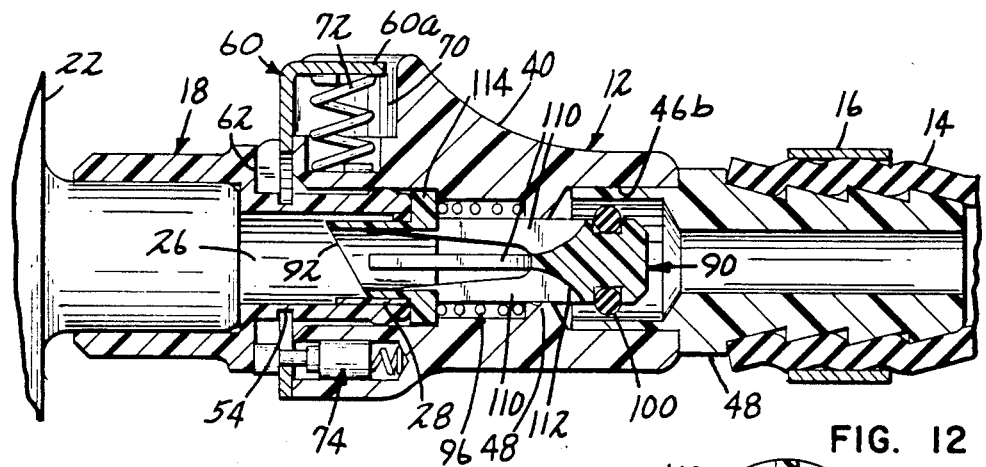
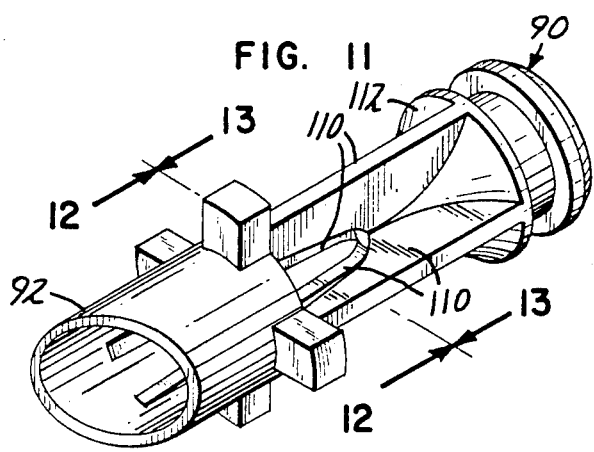
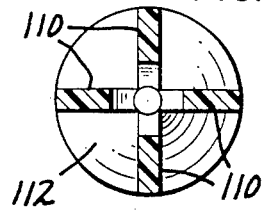
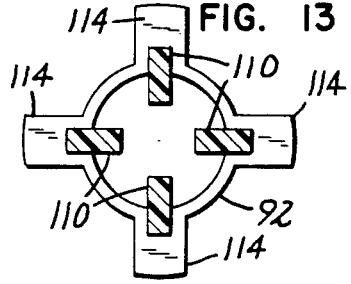

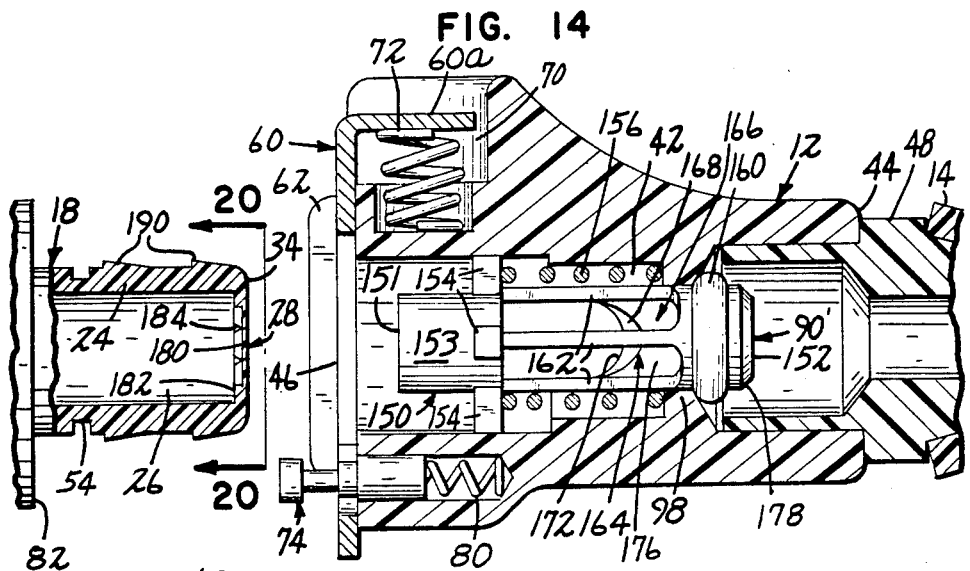
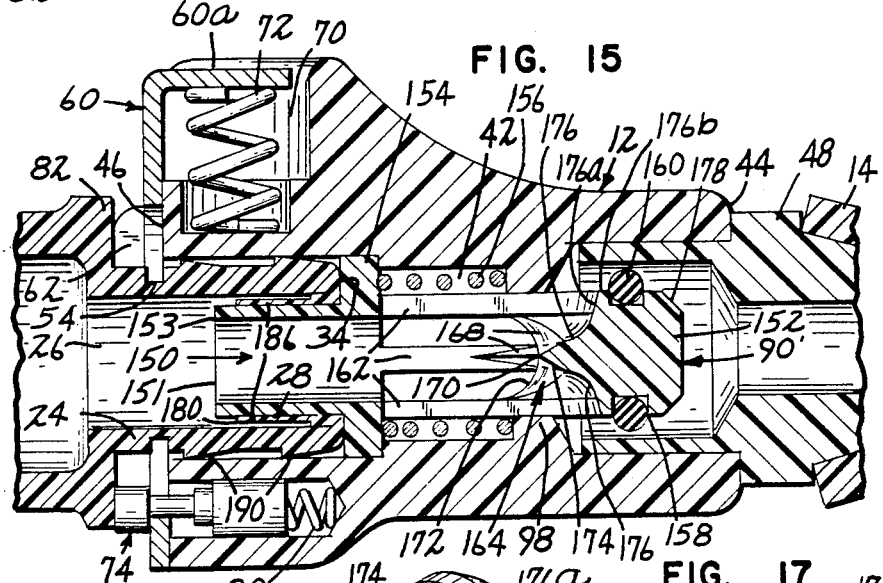
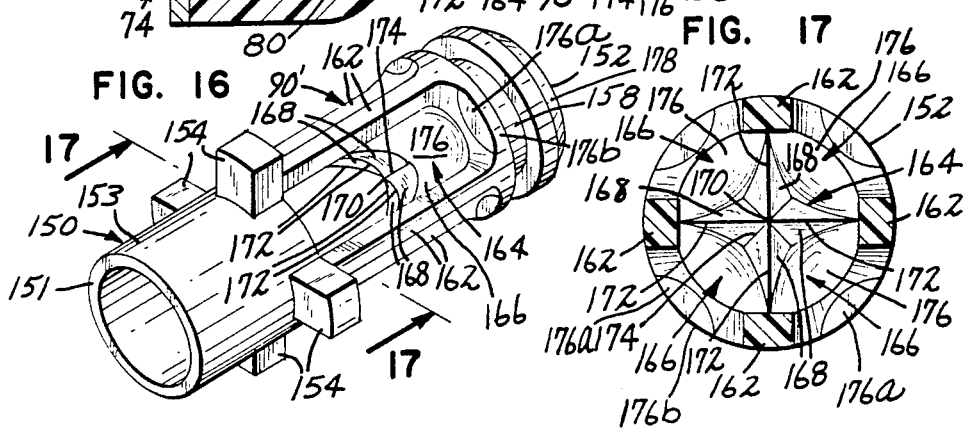

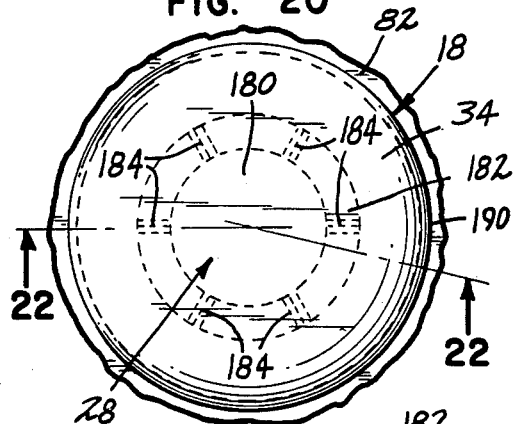
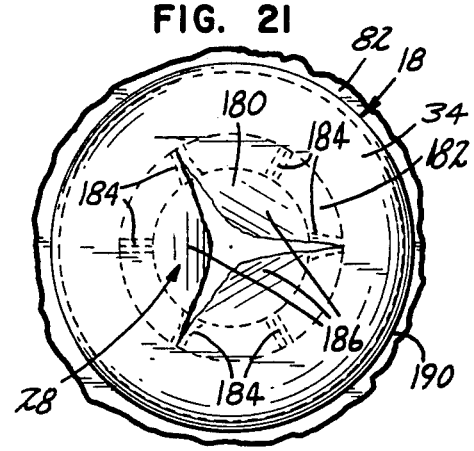
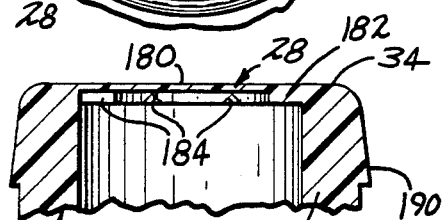
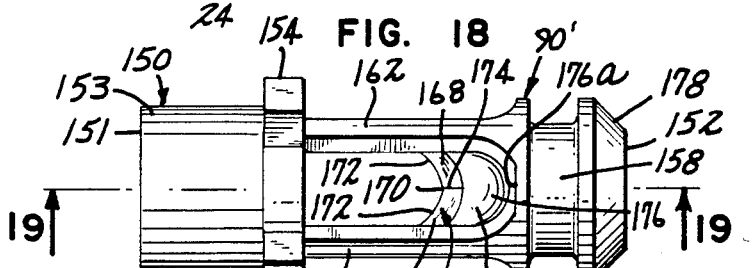
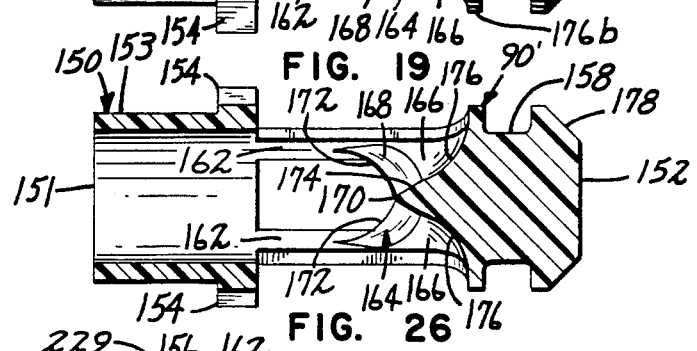
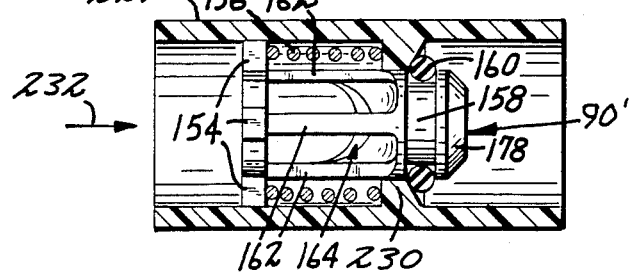

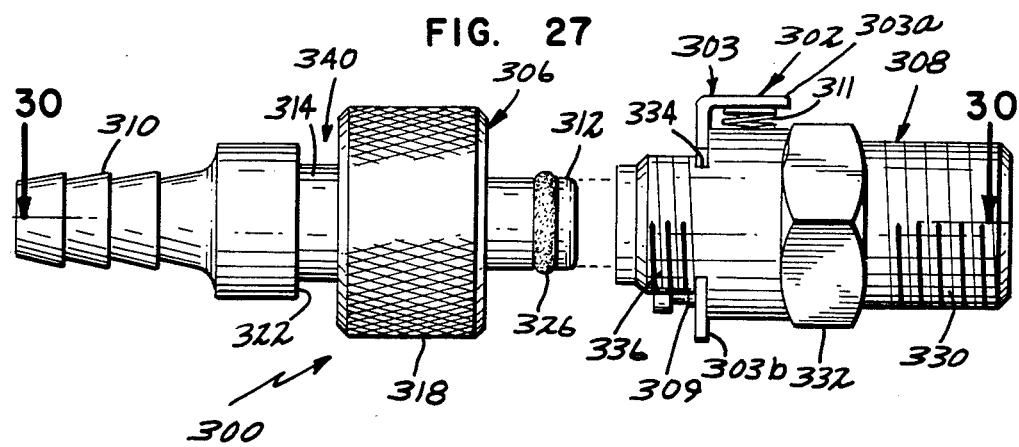
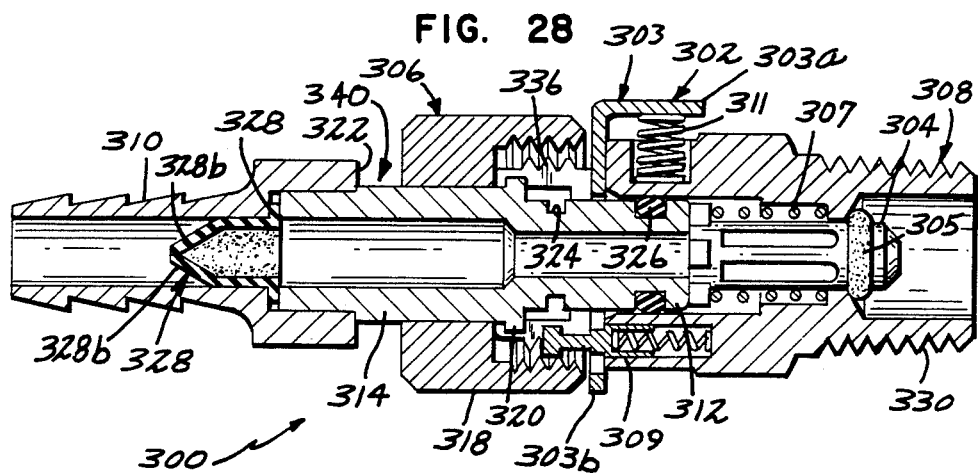
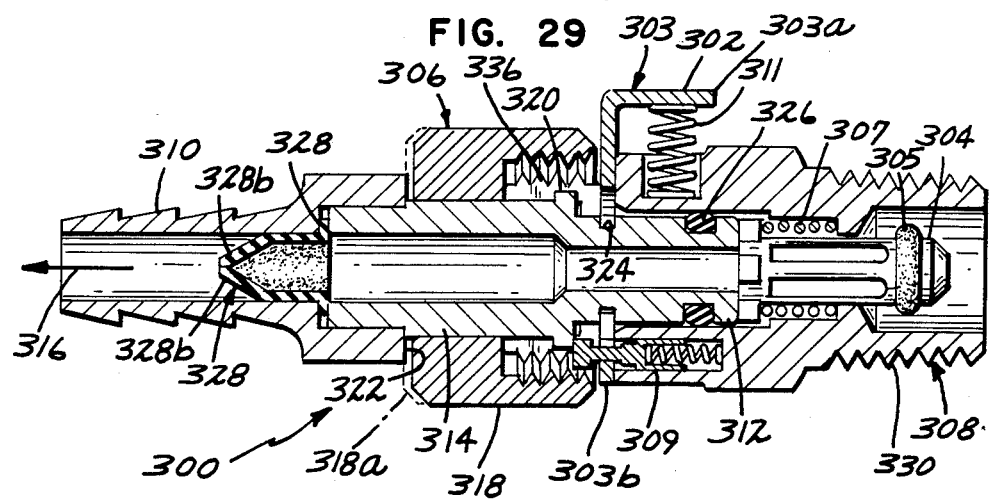

TWO-WAY UNCOUPLING VALVE ASSEMBLY

This application is a continuation-in-part of Ser. No. 455,202, filed Jan. 3, 1983 now abandoned, which in turn is a continuation-in-part of Ser. No. 359,071, filed Mar. 17, 1982 now U.S. Pat. No. 4,436,125.

BACKGROUND OF THE INVENTION

The present invention relates to a two-way uncoupling valve assembly. More particularly, the present invention relates to a two-way uncoupling valve assembly which provides an on/off two-way valve function enabling fluid flow, in particular gas under pressure, to be completely shut off or turned on and an uncoupling function wherein the fluid supply line can be disconnected for easy replacement. In an alternate embodiment of the present invention, a flow control check valve assembly restricting fluid flow in one direction, preferably the upstream direction, is provided.

Two-way valves or shut off valves have long been used in fluid delivery lines. Furthermore, automatic shut off, disconnect coupling assemblies which provide an automatic shut off of fluid flow when disconnected have also been utilized. However, these two functions have not been combined into one mechanism. Rather, two separate units are required to be installed in the fluid supply line. This increases the bulkiness of the line, increases the overall cost, does not facilitate ease of implementation and use, etc.

Furthermore, two-way valves alone have many undesirable features and characteristics which limit their utility in various applications such as the beverage dispensing industry wherein relatively small fluid delivery lines are utilized in a low pressure environment. Many two-way valves are too bulky to facilitate use with relatively small fluid lines. In addition, often the fluid lines are installed in a limited space or are incorporated as part of a portable unit wherein the size of the valves must be minimized.

Additionally, two-way valves and/or uncoupling members often have rather complicated structures utilizing many working parts which increase the overall production and maintenance costs. As a result, these devices are not well suited to applications wherein the devices are utilized in large quantities.

Also, many two-way valves are rather complicated to use, requiring the operator's careful attention and/or more than one simple action. Accordingly, the fluid supply line cannot always be readily opened or shut off as required.

The present invention solves these and many other problems.

SUMMARY OF THE INVENTION

The present invention relates to a two-way uncoupling valve assembly for use in a fluid line, the flow of fluid generally being in a downstream direction. The uncoupling valve assembly including a female coupling member having a front end and a back end, the female coupling member defining a path for the flow of fluid therethrough. The uncoupling valve assembly further includes a male coupling member having a front end and a back end and defining a path for the flow of fluid therethrough. The male coupling member includes adjacent the front end thereof a hollow tubular portion, the hollow tubular portion being constructed and arranged for removable insertion into the front end of the female coupling member. The female coupling member defines an axial tubular bore within which the tubular portion of the male coupling member is concentrically received. The tubular portion of the male coupling member includes a seal about it circumference near the front end of the male coupling member providing a fluid tight seal between the outside surface of the tubular portion and the inside surface of the tubular bore of the female coupling member upon insertion of the male coupling member into the female coupling member. The uncoupling valve assembly further includes a valve assembly adapted for reciprocating longitudinal axial movement within the tubular bore of the female coupling member between a front end and a back end position. The valve assembly is constructed and arranged for engaging the male coupling member upon insertion of the male coupling member into the female coupling member a predetermined distance, whereby the valve assembly is caused to move toward the back end of the female coupling member into the back end position such that fluid flow from the male coupling member through the female coupling member is enabled. The valve assembly includes means for sealing off the fluid flow path through the female coupling member when the valve assembly is in the front end position, whereby fluid flow through the female coupling member is prevented when the male coupling member is removed therefrom. The uncoupling valve assembly further includes locking means proximate the front end of the female coupling member for releasably locking the male coupling member and the female coupling member when the valve assembly is in the back end position. The locking means is activated upon insertion of the male coupling member a predetermined distance into the female coupling member. Release means is interconnected to the locking means for deactivating the locking means whereby the male coupling member is released by the locking means. The uncoupling valve assembly further includes biasing means adapted for biasing the valve assembly toward the front end of the female coupling member into the front end position, whereby when the male coupling member is released by deactivating the locking means, the valve assembly is biased into the front end position thereby preventing the flow of fluid through the female coupling member. Connecting means for removably connecting the male coupling member to the female coupling member in a connected state is provided. The connecting means enables axial movement of the male coupling member to provide for movement of the valve assembly between the back end position and the front end position while in the connected state.

The two-way uncoupling valve assembly of the present invention provides an on/off two-way valve function enabling fluid flow to be completely shut off or turned on and provides an automatic shut off quick disconnect function wherein the fluid supply line can be disconnected for easy replacement of various parts, the fluid flow being automatically shut off when the two-way uncoupling valve assembly is disconnected.

In yet another embodiment of the two-way uncoupling valve assembly of the present invention, a flow control check valve function or restricting flow in one direction, preferably the upstream direction, is provided in the fluid flow path of the male coupling member.

The present invention incorporates the first two above-identified functions or all three functions, depending on the embodiment, into one small unit. The combination of these functions into one mechanism offers in addition to other advantages, small package size, ease of operation, reduced manufacturing material requirements, etc.

In one embodiment of the present invention, the high flow valve disclosed in Ser. No. 455,202, filed Jan. 3, 1983, now abandoned, of which this application is a continuation-in-part, is utilized to provide for maximum fluid flow.

In still another embodiment of the present invention, the locking mechanism in addition to other features as generally disclosed in Ser. No. 359,071, filed Mar. 17, 1982, now U.S. Pat. No. 4,436,125, of which this application is a continuation-in-part, are also utilized.

In a further embodiment of the present invention, color coding is provided to enable specific fluid line identification and/or identification of the on/off status of the two-way uncoupling valve assembly.

In yet another embodiment of the present invention, an aperture is provided in the female coupling member of the two-way uncoupling valve assembly to enable exhausting of line pressure.

Yet another feature of one embodiment of the present invention, is the provision of a feature which enables the two-way uncoupling valve assembly to be locked in the on position such that the locking mechanism which retains the two-way uncoupling valve assembly in the on position is not accidentally deactivated so as to place the uncoupling valve assembly in the off position.

Yet another feature is the provision of relative rotational movement between the male coupling member and female coupling member whether in an open or closed position whereby the fluid lines do not become snarled.

Still another feature of one embodiment of the present invention is the provision of a connecting feature which requires that the uncoupling valve assembly be securely connected prior to placing the valve assembly in an on position. This prevents prematurely turning on of the fluid flow prior to fully connecting the coupling such that the coupling might inadvertently pull apart.

Still another feature of one embodiment of the present invention is the provision of a disconnect feature which requires that the two-way uncoupling valve assembly be shut off before the two-way uncoupling valve assembly can be disconnected. This assures shut off of the fluid flow when the two-way uncoupling valve is disconnected.

These and various other advantages and features of novelty which characterize the invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS (FIGS. 1-26 illustrate embodiments of the invention as disclosed in Ser. Nos. 455,202, now abandoned, and 359,071 now U.S. Pat. No. 4,436,125. An embodiment of the two-way uncoupling valve assembly which is the subject matter of this continuation-in-part is illustrated in FIGS. 27-31.)

In the drawings, in which like reference numerals and letters indicate corresponding parts throughout the several views, FIG. 1 is a view in perspective of an embodiment of the coupling assembly of the present invention;

FIG. 4 is an elevational view along line 4—4 of FIG. 1;

FIG. 5 is an elevational view along line 5—5 of FIG. 1;

FIG. 6 is a sectional view of a portion of FIG. 4;

FIG. 7 is an axial view of one embodiment of a male coupling member of the present invention;

FIG. 8 is an axial view similar to FIG. 7 of an alternate embodiment of a male coupling member of the present invention;

FIG. 9 is an axial view similar to FIG. 2 of an alternate embodiment of the coupling assembly of the present invention;

FIG. 10 is an axial view similar to FIG. 3 of an alternate embodiment of the coupling assembly of the present invention;

FIG. 11 is a view in perspective of an alternate embodiment of a valve assembly utilized in the present invention;

FIG. 12 is an end elevational view along line 12—12 of FIG. 11;

FIG. 13 is an elevational view along line 13—13 of FIG. 11;

FIG. 14 is an axial view similar to FIG. 2 of yet another embodiment of the coupling assembly of the present invention;

FIG. 15 is an axial view similar to FIG. 3 of the embodiment illustrated in FIG. 14;

FIG. 16 is a view in perspective of an embodiment of a housing of a high flow valve assembly of the present invention;

FIG. 17 is an end elevational view along line 17—17 of FIG. 16;

FIG. 18 is a side elevational view of the embodiment illustrated in FIG. 16;

FIG. 19 is a view along line 19—19 in FIG. 18;

FIG. 20 is an elevational view along line 20—20 of FIG. 14;

FIG. 21 is a view similar to FIG. 20 wherein the membrane is in a punctured state;

FIG. 22 is a side view along line 22—22 in FIG. 20;

FIG. 26 is a view in perspective of an embodiment of the high flow valve assembly of the present invention utilized as a check valve;

FIG. 27 is a side elevational view of an embodiment of the invention in a disconnected position;

FIG. 28 is an axial cross-section of the embodiment shown in FIG. 27 in the off or closed position;

FIG. 29 is an axial cross section of the embodiment shown in FIG. 28 in an on or open position;

DETAILED DESCRIPTION OF THE INVENTION (A detailed description of the embodiment shown in FIGS. 1–26 which was the subject matter of Ser. Nos. 455,202, now abandoned, and 359,071, now U.S. Pat. No. 4,436,125, is first provided. A detailed description of the preferred embodiment of the present invention is the subject matter of this continuation-in-part is then provided with respect to FIGS. 27–31.)

Figure 1:
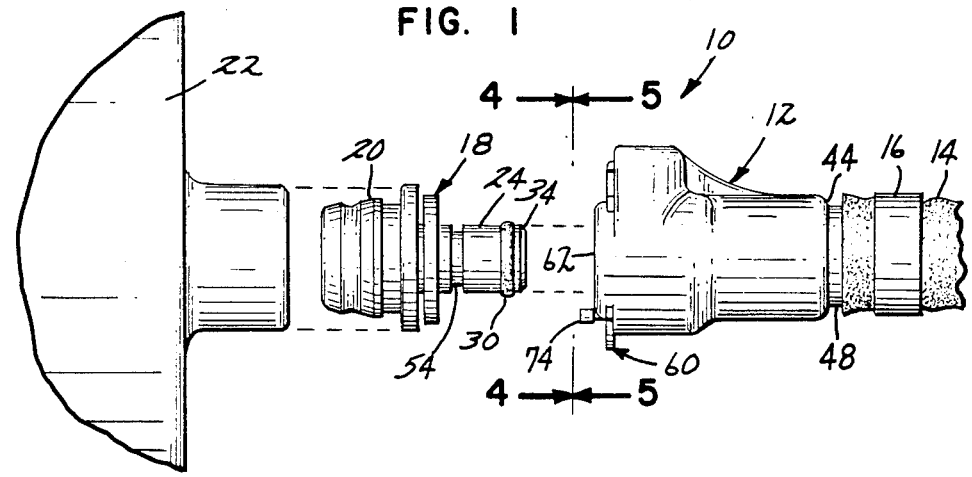

Referring now to the drawings, there is shown in FIG. 1 an embodiment of a coupling assembly 10 embodying the principles of the present invention. Coupling assembly 10 includes the female coupling member 12 adapted for connection to a conduit 14 or the like in any suitable manner. Coupling assembly 10 further includes a male coupling member 18 which is also adapted for connection to a conduit 20 or the like in any suitable manner such as by friction sealing, cement sealing, etc. Conduit 20 to which male coupling member 18 is connected might, for example, be a plug utilized to seal a spout of a container 22 holds a fluid for dispensing therefrom. Coupling members 12 and 18 are each, in turn, adapted to releasably connect to each other so as to provide a fluid-tight passageway or connection between conduits 14 and 20.

Figure 2:
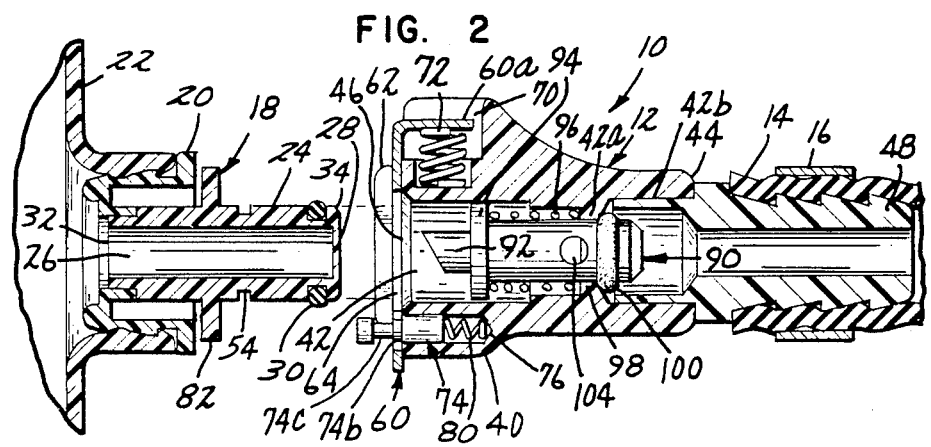
FIG. 2 is an axial view of the embodiment shown in FIG. 1.

More particularly, as illustrated in FIG. 2, male coupling member 18 has a generally hollow tubular housing 24 which defines a longitudinal axial tubular bore 26 or passageway on the inside thereof. Housing 24 has a back end 32 which is open and in connection with conduit 20 and a front end 34 which engages female coupling member 12 and is enclosed by a transversely extending membrane seal 28. Preferably membrane seal 28 is integral with housing 24 such that coupling member 18 is molded by a unitary molding process as a single piece thereby reducing the manufacturing cost and allowing coupling member 18 to be utilized as a disposable item. In one preferred embodiment, coupling member 18 is made from a low density polyethylene with membrane 28 having a thickness of from 0.010 to 0.012 inches.

Coupling member 12 has a housing 40 which also defines an inner tubular bore 42 along a longitudinal axis thereof. Both ends of bore 42 are open with back end 44 is sonic welded to a barbed tubular plastic hose 48 which in turn is connected to conduit 14 with a band 16 being utilized to assure a fluid-tight seal. Tubular bore 42 at front end 46, has an inside diameter which is slightly greater than the outside diameter of housing 24 such that housing 24 is releasably insertable into the bore of coupling member 12.

As illustrated in FIG. 8, one embodiment of housing 24 near front end 34 has on its outer surface an indentation about the circumferential extent thereof which is adapted for reception of an O-ring 30. O-ring 30 extends slightly above the outer surface of housing 24 so as to provide a fluid-tight seal between the housing outer surface and the inner surface of bore 42.

In yet another embodiment shown in FIG. 7, housing 24 is illustrated as having an integral collarlike member 52 about the circumferential extent thereof near front end 34. Collar member 52 protrudes slightly above the outer surface of housing 24 so as to provide a fluid-tight seal with the inner suface of bore 42.

As illustrated in FIG. 2, further removed from front end 34 of coupling member 18 is a second indentation 54 in the outer surface of housing 24 which extends about the circumferential extent thereof. Indentation 54 cooperates with a releasable locking mechanism mounted near the front end of housing 40 of female coupling member 12 so as to releasably lock both coupling members together when coupling member 18 is inserted a predetermined axial distance into coupling member 12.

Figure 3:
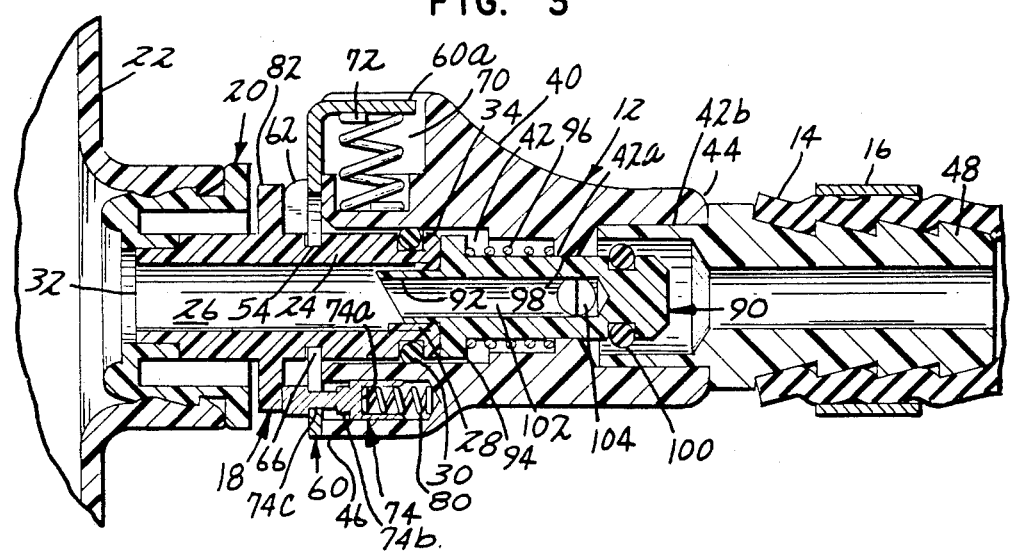
FIG. 3 is an axial view similar to FIG. 2 wherein the parts are in a differing relationship.

The locking mechanism includes a locking collar or plate 60 which is slideably mounted in grooves formed by two integral members 62 extending from the front end of housing 40. Plate 60 is slideably mounted for transverse movement of bore 42 between a first or released position as illustrated in FIGS. 2 and 4 and a second or locking position as illustrated in FIGS. 3 and 4.

Plate 60 defines an annular aperture 64 therein such that in the open position as illustrated by the solid line in FIG. 4, housing 24 of the male coupling member can be inserted therethrough into bore 42 of the female coupling member 12. In the locked position as illustrated by the dotted line in FIG. 4, an inner edge 66 of plate 60 projects into the bore of coupling member 12 and engages indentation 54 on the male coupling member 18, as illustrated in FIG. 3, thereby releasably locking coupling member 18 with coupling member 12.

Housing 40 of coupling member 12 is constructed and arranged so as to form an indentation or cavity 70 on one side thereof near front end 46. Plate 60 includes a portion 60a which is folded over so as to provide a relatively flat lever which fits in the space provided by indentation 70. A coiled spring 72 is positioned between lever portion 60a and the bottom of indentation 70 so as to bias plate 60 transversely of bore 42 and toward the second or locked position wherein plate 60 engages indentation 54 of the male coupling member. A locking pin 74 of varying diameter, positioned in an axially extending bore 76, serves to retain plate 60 in its open or unlocked position when the coupling members are not attached. Bore 76 is positioned radially outward from bore 42 and on the opposite side of bore 42 from lever 60a so as to be diametrically opposed to lever 60a.

Pin 74 extends through a slot defined by edges 78a, 78b in plate 60 which extend radially outward from inner edge 66. Pin 74 is axially movable between a first position wherein pin 74 retains plate 60 in its unlocked state and a second position wherein pin 74 allows spring 72 to move plate 60 into its locking position. Pin 74 in its second position also serves to limit the distance which plate 60 moves from its unlocked position to its locked position.

A coiled spring 80 is positioned between a collar portion 74a of pin 74 and the end of bore 76 so as to axially bias pin 74 toward the first position. Housing 24 of male coupling member 18 has on its outer surface an outwardly extending collar 82 about the circumferential extend thereof which is spaced a predetermined axial distance from indentation 54 toward the back end housing 24. Collar 82 is constructed and arranged to engage pin 74 as coupling member 18 is inserted into coupling member 12 such that pin 74 is axially slid into its second position.

As illustrated in FIGS. 4 and 6, radially extending edges 78a are spaced farther apart than edges 78b such that the slot in plate 60 has a portion near edge 66 with a greater width than the portion near the end of the slot farthest removed from edge 66. When pin 74 is in the first position, or unlocked position, a portion 74b of pin 74 having a greater diameter than the width of the slot defined by edges 78b extends through the slot so as to make contact with edges 78b and prevent plate 60 from being moved into the locked position by coil spring 72.

As male coupling member 18 is inserted into female coupling member 12, collar 82 engages the end of lock pin 74 and moves it axially until a portion 74c of locking pin 74 having a diameter less than the width of the slot defined by edges 78b is aligned therewith such that locking pin 74 no longer engages edges 78b. Plate 60 is then moved into the locking position by coil spring 72 and engages indentation 54.

By pressing radially inward on plate 60a, plate 60 is caused to move radially such that pin 74 extends through the enlarged slot portion near edge 66. In addition, plate 60 is disengaged from indentation 54, whereby male coupling member 18 can be removed from female coupling member 12. When coupling member 18 is removed, spring 80 biases pin 74 toward its first position, whereby pin portion 74b engages edges 78b of the slot and retains plate 60 in its unlocked position. Pin 74 includes a portion 74d between portions 74a and 74b which is of greater diameter than 74b so as to engage plate 60 and retain pin 74 in axially extending bore 76.

A valve assembly 90 or automatic shut off is slideably mounted on a circumferential inwardly projecting member or surface 98 of bore 42 for axial longitudinal movement of bore 42 between first and second positions. Member 98 forms a bore portion 42a of lesser diameter than a bore portion 42b near back end 44 of female coupling member 12. Valve assembly 90 includes a hollow needle-like structure 92 which extends axially toward the front end of coupling member 12. The needle-like structure 92 is constructed and arranged at its front end for puncturing membrane 28 as male coupling member 18 is inserted into female coupling member 12. In the preferred embodiment shown, the front end of needle 92 is biased so as to lie in an oblique plane with respect to the plane of membrane 28. Needle-like structure 92 has an outside diameter which is less than the inside diameter of bore 26 such that as illustrated in FIG. 3 needle-like structure 92 extends a limited axial distance into bore 26 when the coupling members are in a locked or connected position.

Immediately adjacent needle-like structure 92 is an outwardly extending collar 94 which is adapted for guiding valve 90 in bore 42 and for engaging front end 34 of the male coupling member so as to limit the axial distance which needle-like structure extends into the interior of bore 26. In addition, collar 94 retains a coiled spring 96 between itself and inwardly projecting member 98 of housing 40. Coiled spring 96 surrounds the body of the valve assembly and biases the valve assembly toward front end 46 of the female coupling member. When the female coupling member 12 is released from the male coupling member 18 by pressing down on the plate 60a, the spring biased valve assembly 90 assists in removing the male coupling member 18 from the female coupling member 12.

Near the opposite end of valve assembly 90 is an indentation 91 in the outer surface thereof which extends about the circumference thereof and is adapted for retaining an O-ring 100 which serves as a seal between valve assembly 90 and member 98 when valve assembly 90 is in the closed or first position. In addition, O-ring 100 cooperates with member 98 to limit the axial displacement of the valve assembly by spring 96.

When male coupling member 18 is inserted into female coupling member 12, valve assembly 90 is forced axially toward the back end 44 of female coupling member 12 into the open or second position. This is accomplished by the engagement of collar 94 with the front end of the male coupling member 18. The axial displacement toward back end 44 is limited by collar 82 on the male coupling member which engages the front end 46 of the female coupling member and prohibits any further insertion.

In the embodiment illustrated in FIGS. 2 and 3, the portion of valve assembly 90 between collar 94 and O-ring 100 is a hollow tubular member 102 closed at the back end and open at the front end so as to allow the flow of fluid from needle-like structure 92 into tubular member 102. An aperture 104 is positioned near O-ring 100 along member 102 such that when valve assembly 90 is in the second position, aperture 104 defines a fluid passageway from the interior of tubular member 102 to bore portion 46b adjacent back end 44 of the female coupling member whereby continuous fluid flow passage is provided through the quick connect coupling.

In yet another embodiment illustrated in FIGS. 9 through 13, that portion of the valve assembly between needle-like structure 92 and O-ring 100 is shown as including four radially extending ribbed members 110 which define multiple flow paths from needle-like structure 92 to enlarged bore portion 46b when the couplings are attached. The rib members 110 are in turn attached at their back ends to a cone-shaped end piece 112 which aids in channeling the fluid flow around the valve end adjacent the O-ring seal. In addition, rather than a collar 94, this embodiment utilizes four radially projecting members 114 for guiding the valve assembly in bore 42 of the female coupling member.

In yet another embodiment of the present invention as illustrated in FIGS. 9 and 10, projecting members 114 are utilized as a positive locking collar for limiting the axial displacement of valve assembly 90 by male coupling member 18. In this embodiment, projecting members 114 engage an inwardly extending member 116 of housing 40.

Because membrane seal 28 is made of a low density polyethylene, it will puncture quite readily as illustrated in FIG. 5 rather than shearing so as to prevent any contamination of the fluid by membrane parts. In addition, since the entire male coupling member 18 can be made from a unitary molding process as a single piece, the cost of manufacturing is greatly reduced allowing the male coupling member to be utilized as a throw-away item after one-time usage.

In a typical application, male coupling member 18 is attached to a container or the like in a suitable manner at the time of filing the container with a fluid or substance so as to effectively seal the contents until use. Female coupling member 12 is in turn typically attached to a dispensing line through which a fluid is to be dispensed. When access to the package or container is required, male coupling member 18 can be grasped by one hand and inserted in female coupling member 12. As male coupling member 18 is inserted into female coupling member 12, the needle-like structure 92 of the valve assembly 90 punctures membrane seal 28 whereby providing a fluid path through the coupling assembly into the dispensing line. This process is accomplished with very little resistance due to the low density polyethylene material utilized and the relative thinness of membrane seal 28. Once inserted a predetermined distance, the releasable locking mechanism will automatically lock the coupling members together.

When the container is empty, the coupling members can be disconnected with one hand by pressing on lever 60a of the locking mechanism which releases male coupling member 18 and allows it to be withdrawn from female coupling member 12.

When the male coupling member 18 is withdrawn from female coupling member 12, the valve assembly 90 is biased into its forward position and automatically seals the fluid passageway through the female coupling member such that there is no spillage or loss of fluid. The empty container and male coupling member 18 can then be disposed of.

The present invention, because of its inexpensive costs and ease of use is particularly advantageous in single use applications such a pre-packaged items. In addition, it is particularly advantageous in those applications such as hospital and laboratory environments where contamination of the fluids must be avoided at all costs. The present invention allows the fluid to be sealed until the very time of use.

Illustrated in FIGS. 14 andd 15 is an embodiment of a quick connect/disconnect coupling assembly of the present invention utilizing an embodiment of a high flow valve assembly 90' which increases the realizable fluid flow through the coupling assembly. As illustrated in FIG. 16, the high flow valve assembly 90' includes a generally tubular housing 150 defining first and second end portions 151, 152. The valve housing 150 is slideably mounted on the inwardly projecting member or surface 98 of the female coupling member 12 for axial longitudinal movement of the bore 42 in the female coupling member 12 between first and second positions as illustrated in FIGS. 14 and 15, respectively. The valve housing 150 includes a hollow tubular needle-like structure 153 proximate the first end portion 151 which extends axially toward the front end of the female coupling member 12. The tubular structure 153 is constructed and arranged at its front end for puncturing the membrane 28 of the male coupling member 18 as the male coupling member is inserted ito the female coupling member 12. In the preferred embodiment shown, the front end of the needle-like structure 153 generally lies in a plane parallel with respect to the plane of the membrane 28 at the end of the male coupling member 18. As illustrated in FIG. 15, the tubular structure 153 extends a limited axial distance into the bore 26 of the male coupling member 18 when the coupling members are in a locked or connected position.

As illustrated in FIGS. 15 and 16, adjacent to the tubular structure 153, are a plurality of radially, outwardly projecting, generally rectangular-shaped members 154 which are adapted for guiding the valve assembly 90' in the bore 42 of the female coupling member and for engaging the front end 34 of the male coupling member 18 so as to limit the axial distance which the tubular structure 153 extends into the interior of the male coupling member bore 26. In addition, the radially projecting members 154 retain a coiled spring 156 about the periphery of the valve housing 150 between the radially projecting members 154 and the inwardly projecting member 98 of the female coupling member 12. The coiled spring 156 surrounds the valve housing 150 and biases the valve housing 150 toward the front end 46 of the female coupling member 12. It will be appreciated that other suitable radially projecting configurations might be utilized for this purpose; for example, a cylindrical collar member as illustrated in FIG. 2 might also be utilized.

Near the second end portion 152 of the valve housing 150 is a groove 158 about the circumference thereof adapted for retaining an O-ring 160. The O-ring 160 as with the prior embodiments of the valve assembly serves as a seal between the valve assembly and the projecting member 98 when the valve assembly is in the closed position. In addition, the O-ring 160 cooperates with the inwardly projecting member 98 of the female coupling member 12 to limit the axial displacement of the valve housing 150 by the coiled spring 156.

As with the previous embodiment of the quick connect/disconnect coupling assembly 10, when the male coupling member 18 is inserted into the female coupling member 12, the valve assembly is forced axially toward the back end 44 of the female coupling member 12 into the opened position. This is accomplished by the engagement of the radially projecting members 154 with the front end of the male coupling member 18. The extent of insertion is limited by the collar 82 on the male coupling member 18 which engages the front end 46 of the female coupling member 12, in particular the locking pin 74, and prohibits any further insertion.

In the preferred embodiment of the high flow valve assembly, as illustrated in FIGS. 16 through 19, the portion of the valve housing 150 between the first end portion 151 and the second end portion 152 is a cagelike structure with generally rectangular elongated members 162 interconnecting the first and second end portions 151, 152. The elongated members 162 are generally parallel to a longitudinal axis of a valve housing 150 and are spaced circumferentially generally about the periphery of the valve housing 150 so as to not interfere with the fluid flow through the valve housing 150. The elongated members 162 have a cross-section which is as small as possible while yet enabling the elongated members 162 to provide the valve housing 150 with sufficient structural integrity.

Near the second end portion 152, the elongated members 162 are interconnected to one another and the inside surface of the enclosed second end portion 152 so as to form a symmetrical rib-like structure 164 dividing the inside surface of the second end portion 152 into four distinct surface regions 166, each having substantially the same configuration. As illustrated in FIGS. 16 and 17, the rib-like structure 164 includes fillet members 168 extending from a point 170 positioned along the central longitudinal axis of the valve housing 150 to the elongated members 162 at the periphery of the housing 150. In the preferred embodiment shown, the fillet members 168 intersect one another at a substantially ninety degree angle such that the regions 166 are of generally equal areas.

Each of the fillet members 168 define a curvilinear, leading edge 172 facing in the direction of the first end portion 151. The leading edges of the fillet members 168 cooperate to generally form two parabolic arches, with the fillet members 168 interconnecting with the elongated members 162 at a location closer to the first end portion 151 than their point of interconnection 170 along the longitudinal axis.

The walls of the fillet members 168 near the leading edges 172 are linearly tapered to intersect at the leading edge so as to form an area on the surface regions 166 having a generally linear diverging surface area 174 as illustrated in FIGS. 15 through 19. The remaining surface area of the surface regions 166 includes a generally cuvilinear surface 176 which extends from the linear surface area 174 to the periphery of the valve housing 150. (In the preferred embodiment illustrated in FIGS. 16 and 17, there are slight variations in the surface area 176 as indicated by the designated areas 176a and 176b. These variations are due to the particular molding process utilized to form the housing 150 of the preferred embodiment and do not materially effect the function of the valve assembly.)

The streamline design of the rib structure 164 and the generally diverging surface regions 166 provides minimal interference to the fluid flow as the fluid flows between the elongated members 162 near the second end portion 152, thereby resulting in minimal turbulence.

Furthermore, due to the relative small cross-section of the elongated members 162 and their location about the periphery of the housing, the size of the fluid passageway is not significantly reduced. In the preferred embodiment, the inside walls of the elongated members 162 define a cage portion having a diameter equal to that of the tubular member 153 of the valve housing 150 so as to enable the same amount of fluid flow through the cage portion as through the tubular member 153.

Furthermore, when the valve assembly is in the opened position, the flow space between adjacent elongated members 162 is maximized due to the relatively slight cross section of the elongated members 162 and their elongated configuration. Consequently, fluid flow around the second end portion 152 is greatly increased over conventional valve assemblies.

Where spacing constraints will allow, the radius of curvature of the curvilinear surface area 176 may be gradually increased which results in the intersection point 170 of the fillet members 168 being further removed from the second end portion 151. Indeed the radius of curvature of the surface area 176 might be increased to the extend wherein the surface area 176 is generally linear so as to provide the second end portion with a genearlly cone-shaped inside surface. In the embodiment shown, due to the rather restrictive space restraints, the intersection point 170 of the preferred embodiment shown, is located as close as possible to the second portion 152 while minimizing fluid turbulence.

Use of the elongated members 162 of the present invention reduces the amount of material required to make the valve housing 150. This reduction in mass results in a more inexpensive and more accurate manufacturing process as the housing 150 is less subject to shrinkage.

Furthermore, the symmetrical configuration of the valve housing 150 readily adapts the valve housing to injection molding processes.

In the preferred embodiment of the valve assembly illustrated, the second end portion 152 of the housing 150 includes tapered side walls 178 adjacent the back end thereof so as to provide minimum interference to the fluid flow on the back side of the valve housing 150 thereby resulting in less turbulence. The tapered side walls 178 facilitate the placement of the O-ring 160 over the end of the housing 150 and into the groove 158. Furthermore, the valve assembly is readily adaptable to fluid flow from either direction.

In the embodiment of the quick connect/disconnect coupling assembly illustrated in FIGS. 14 and 15, additional modifications have been made to the male coupling member 18 to facilitate puncturing of the membrane seal 28 and to provide for an adequate seal between the male coupling member 18 and the female coupling member 12. As illustrated in FIGS. 20 through 22, the membrane seal 28 in one embodiment includes a central portion 180 and a peripheral portion 182. The central portion 180 has a substantially reduced thickness compared to that of the peripheral portion 182. In addition, there are a plurality of radially extending V-shaped indentations 184 which extend from the central portion 180 to the periphery of the membrane seal 28. As illustrated in FIG. 22, the V-shaped indentations 184 form indentations which at their thinnest part have a thickness equal to that of the central portion 180. In the preferred embodiment shown, the central portion 180 has a thickness of substantially six thousandths (0.006) of an inch while the peripheral portion 182 has a thickness of substantially one one-hundredths (0.01) of an inch.

The thickened peripheral portion 182 assists in preventing excessive bulge of the membrane seal 128 due to pressure thereon while the thin central portion 180 facilitates puncturing of the membrane seal 28 by reducing the amount of force required during the puncturing process. Furthermore, the radially extending indentations 184 provide for a more uniform puncturing or tearing of the membrane seal 28 as the membrane seal 28 has a tendency to sever along the radially extending indentations 184 when the tubular member 153 of the valve assembly is utilized to puncture the membrane seal. Illustrated in FIG. 21 is a typical puncture pattern. As illustrated, the membrane 28 typically will sever along the indentations 184 so as to form three or more flaps 186.

In the preferred embodiment of the valve assembly as illustrated in FIG. 15, the tubular member 153 has a longitudinal extent which is greater than the radius of the membrane 28. As a result, when the membrane 28 is punctured by the tubular member 153, the flap portions 186 of the membrane are totally contained between the outside surface of the tubular member 153 and the inside surface of the male coupling member 18. Due to this incapsulation or detention of the flaps 186 between the adjacent wall structures, the flaps 186 are prevented from interferring with the fluid flow.

In addition, the forward end of the tubular member 153 as illustrated in FIG. 16, lies in a plane generally parallel to the membrane seal 28. This assures the near simultaneous engagement of the tubular member 153 about the circumference thereof with the membrane seal 28. This aids in preventing one portion of the membrane seal 28 being engaged and stretched prior to the other portion, which might result in the membrane 28 tearing apart near the periphery thereof thereby causing a portion of the membrane 28 to be drawn into the center of the valve assembly.

The membrane seal is preferably made from a material which is not brittle and yet relatively easy to puncture. Examples of materials from which the membrane seal 28 might be made are low density polyethylene having a specific gravity of less than or equal to 0.93, ethylene vinyl acetate, and ionomer.

Furthermore, to assist in providing for an effective seal between the male coupling member 18 and the female coupling member 12 under the increased fluid flow environment, the male coupling member 18 includes a pair of spaced, wedge-shaped projections 190 about the tubular portion 24 of the male coupling member 18. A first of the wedge-shaped projections 190 is positioned adjacent the front end 34 of the male coupling member 18. A second of the wedge-shaped projections 190 is positioned adjacent the indentation 54. The first wedge-shaped projection 190 provides the primary sealing function between the male coupling member 18 and the female coupling member 12, whereas the second of the wedge-shaped projection members 190 primarily serves to stabilize the first wedge-shaped projection so there is no distortion or movement near the front end 34 of the male coupling member 18. Should extraneous side loading be placed on one of the couplings, the second wedge-shaped projection 190 will assist in preventing the first wedge-shaped projection 190 from being moved or distored thereby assuring a fluid tight seal even when there is a noticeable side loading effect. In addition, the second wedge-shaped projection 190 functions as a secondary seal. The wedge-shaped projections are particularly effective in those embodiments wherein the male coupling member 18 and the female coupling member 12 are made by an injection molding process. Frequently, the tubular portion 24 of the male coupling member 18 and/or the female coupling member bore 42 will not be perfect cylinders. The wedge-shaped projections 190 by projecting radially beyond the tubular portion 24 of the male coupling member 18 will provide for a suitable seal even in the light of such imperfections.

The wedge-shaped members 190 are tapered inwardly from the back to the front so as to facilitate ease of insertion of the male coupling member 18 onto the female coupling member 12 and yet provide an effective interference seal between the two coupling members.

Furthermore, use of the wedge-shaped members 190, which in the preferred embodiment are integral with the male coupling member, enables the male coupling member to have a larger inside diameter in the bore 26 or fluid flow path therethrough. Since an O-ring is not utilized for sealing purposes, the wall thickness may be reduced as the groove for retaining the O-ring is not required.

Figure 23:
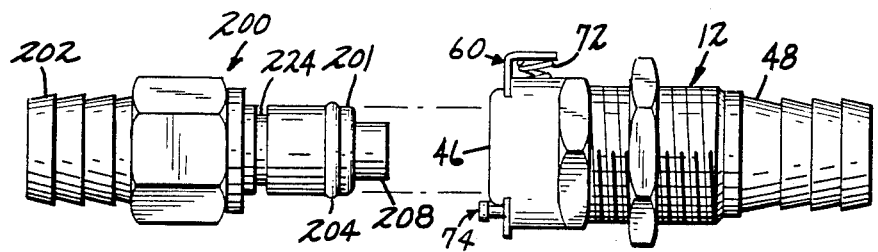
FIG. 23 is a perspective view of an embodiment of a double shut off reusable coupling connection utilizing an embodiment of the high flow valve assembly of the present invention.
Figure 24:
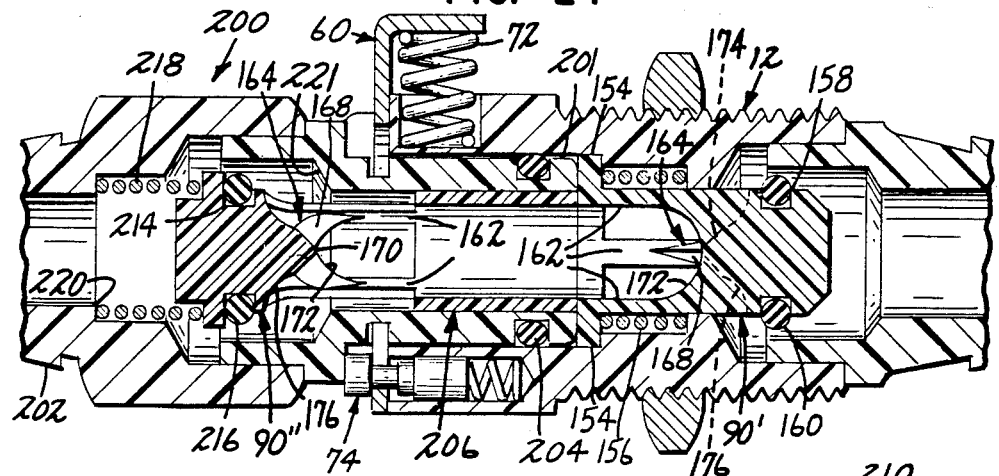
FIG. 24 is a cross-sectional view of the embodiment illustrated in FIG. 23 wherein the parts are in a differing relationship.
Figure 25:
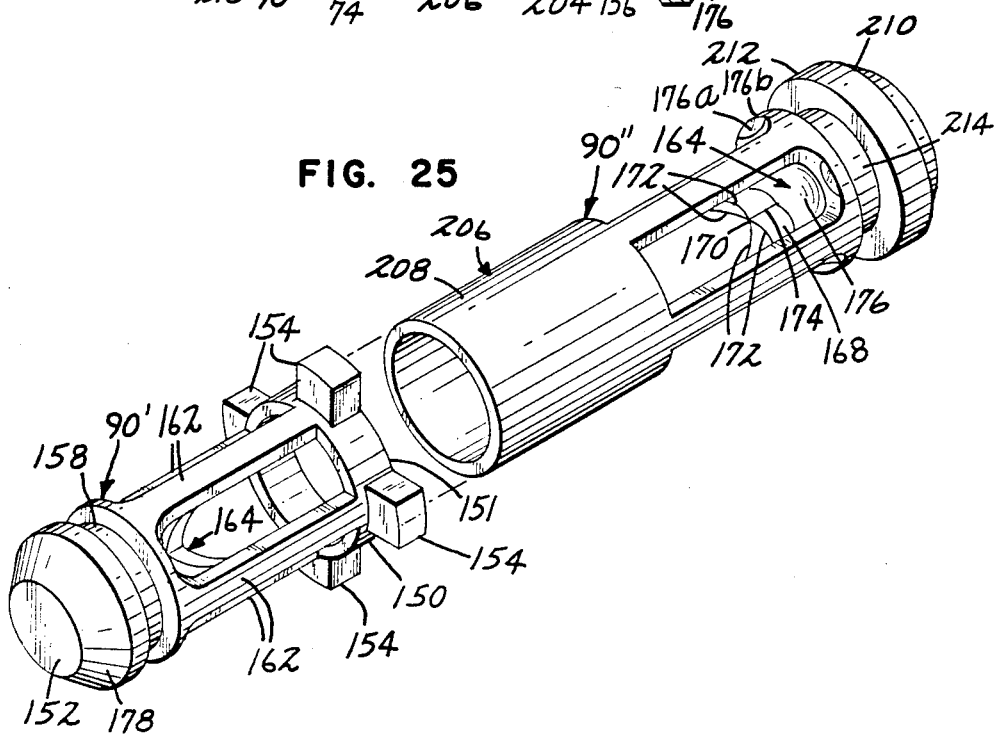
FIG. 25 is a perspective view of embodiments of male and female valve assembly housings utilized in the coupling connection shown in FIG. 23.

The valve assembly utilized in the quick connect/disconnect coupling assembly illustrated in FIGS. 14 and 15 may be utilized in many varying and diverse applications. For example, the valve assembly is shown in FIGS. 23 through 25 as being utilized in a reusable double coupling assembly. The valve assembly is basically the same as that utilized in the quick connect/disconnect coupling assembly of FIGS. 14 and 15 with the exception that there is no needle-like structure extending beyond the radially projecting members 154 since this is a reusable coupling assembly and there is no membrane member 28 to puncture. As opposed to the disposable male coupling member 18 illustrated in FIGS. 14 and 15, a reusable male coupling member 200 is illustrated as cooperating with the female coupling member 12 to provide a reusable coupling assembly. The male coupling member 200 defines a first end portion 201 generally adapted for insertion into the female coupling member 12 and a second end portion 202 generally adapted for insertion into a fluid tubing. The generally cylindrical first end portion includes an O-ring 204 to provide a fluid type seal between the male coupling member 200 and the female coupling member 12. It will be appreciated that, as previously discussed, other structures might be utilized to provide a fluid type seal.

Mounted for longitudinal movement within the male coupling member 200 is a high flow valve assembly 90" somewhat similar to the high flow valve assembly 90' of the female coupling member 12. As illustrated in FIG. 25, the high flow valve assembly of the male coupling member 200 includes a housing 206 defining first and second end portions 208 and 210. The first end portion 208 is a generally hollow cylindrical portion. The second end portion 210 includes a cylindrical radially projecting collar 212 and a groove 214 adapted for receipt of a O-ring 216 or the like. As illustrated in FIG. 24, a coiled spring 218 engages the collar 212 and a shoulder portion 220 in the bore of the male coupling member 200 so as to bias the valve housing 206 into a forward or closed position. The O-ring 216 provides a fluid-tight seal between the valve housing 206 and the bore of the male coupling member 200 by cooperating with a shoulder portion 221 when the valve is in the closed position. In addition, the O-ring 216 engages the inwardly projecting shoulder portion 221 to limit the forward axial displacement of the valve housing 206. As with the disposable male coupling member 18, the male coupling member 200 includes an indentation 224 which is engaged by the plate 60 of the female coupling member 12. To releasably retain the coupling members in an interconnected position.

Upon insertion of the male coupling member 200 into the female coupling member 12, the valve housings 150 and 206 engage one another and are forced into their open positions thereby enabling the flow of fluids therethrough.

As illustrated in FIG. 26, the high flow valve assembly 90' of the present invention may also be utilized as a check valve in a fluid line. The valve assembly 90' is suitably mounted in a housing 229 on a collar portion 230 for axial movement thereof. When there is sufficient fluid pressure, the direction of fluid being generally indicated by an arrow 232, the valve assembly 90' is forced in a downstream direction thereby enabling the flow of fluid therethrough. The housing 229 may be connected to a fluid line in any suitable fashion. It will further be appreciated that the valve assembly of the present invention may be utilized in many other applications and environments.

Illustrated in FIGS. 27 through 31 is a preferred embodiment of the two-way uncoupling valve assembly, generally designated by the reference numeral 300, of the present invention. The two-way uncoupling valve assembly utilizes a locking mechanism 302 similar to that illustrated in FIGS. 1 through 3. In addition, the preferred embodiment of the two-way uncoupling assembly of the present invention utilizes a poppet valve assembly 304 having high flow features similar to that shown in FIGS. 14 through 26. The overall configuration of the poppet valve assembly 304 is similar to that shown in FIG. 26, as the poppet valve assembly 304 of the preferred embodiment does not include a needle-like portion for puncturing a membrane seal although in certain applications the poppet valve assembly 304 might include such. The uncoupling valve assembly 300 includes a male coupling member 306 and a female coupling member 308. As illustrated in FIGS. 27 through 31, the male coupling member 306 is fixedly attached to a barbed portion 310 which provides for suitable connection to a fluid line; however, it will be appreciated that the male coupling member 306 might be suitably attached to varying configurations of adapters to enable use in a variety of environments. The male coupling member 306 generally defines a hollow tubular member having a first tubular portion 312 proximate the front end and a second tubular portion 314 proximate the back end, the male coupling member 306 defining a fluid flow path therethrough. As illustrated by an arrow 316, fluid flow is in a generally downstream direction. Slideably and rotatably positioned over the second tubular portion 314, is a threaded nut 318, the nut 318 being slideably mounted for axial longitudinal movement of the male coupling member 306. The threaded nut 318 is maintained on the second tubular portion 314 by stops which in the preferred embodiment are formed by a collar 320 proximate the upstream end or front end of the second tubular portion 314 and a shoulder surface 322 formed by the barbed portion 310 which is fixedly attached to the downstream or back end of the second tubular portion 314. Accordingly, the threaded nut 318 is freely slideable between the respective stops. The first tubular portion 312 defines a groove 324 proximate the downstream or front end thereof, the groove being adapted for receipt of a locking collar 303 of the locking mechanism 302 in a manner similar to that illustrated in FIGS. 1 through 3. Proximate the upstream or front end of the first tubular portion 312, there is an O-ring 326 positioned about the circumference of the first tubular portion 312. The O-ring 326 provides a fluid-tight seal between the first tubular portion 312 and the interior wall of the female coupling member 308; however, the O-ring 326 enables relative rotational movement between the male coupling member 306 and the female coupling member 308. In the embodiment illustrated, positioned at the downstream or back end of the second tubular portion 314 is a check valve 328 which in the preferred embodiment is illustrated as being of a duck bill valve configuration. The check valve 328 prevents back flow in the fluid line should a pressure differential develop wherein there is more pressure in the downstream direction than in the upstream direction.

The female coupling member 308 includes a threaded portion 330 proximate the upstream or back end thereof enabling the female coupling member to be attached to an adapter such as might exist on a beverage distribution manifold or line regulator. However, it will be appreciated that alternate configurations might be utilized to enable utilization of the female coupling member in varying applications. Downstream from the threaded portion 330 is a portion having an external hexagonal configuration 332. Further downstream on the interior of the female coupling member 308 is a groove 334 which enables the locking collar 303 of the locking mechanism 302 to be slideably mounted therein for movement transversely to that of the longitudinal axis of the female coupling member 308. Proximate the downstream or front end of the female coupling member is a threaded portion 336. The threaded portion 336 is threaded to enable the threaded nut 318 to be removably threaded thereon. The threaded portion 336 in the preferred embodiment includes two radially opposed portions extending in a downstream direction from the front end of the female coupling member 308. The threaded portions 336 are curvilinear and encompass roughtly one-half of the total circumference of the female coupling member 308.

Figure 31:
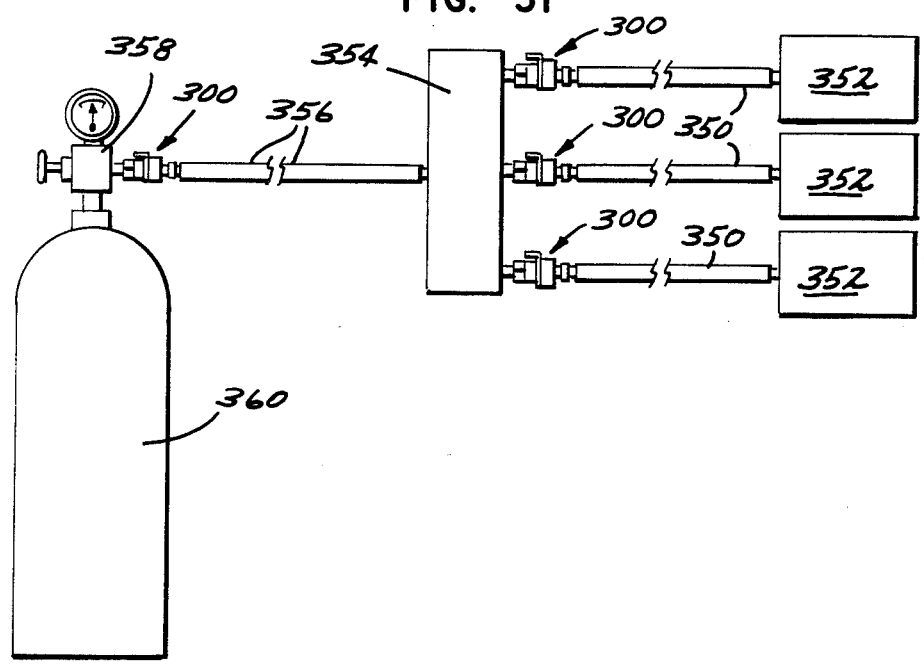

As illustrated in FIG. 31, the two-way uncoupling valve assembly of the present invention is particularly suited for beverage dispensing; for example, beer and wine dispensing. As illustrated in FIG. 31, the two-way uncoupling valve assembly 300 might be utilized to connect carbon dioxide $CO_2$ gas lines 350 from kegs or barrels 352 to a manifold 354. In addition, the two-way uncoupling valve assembly 300 is also shown as being utilized in the system to interconnect a $CO_2$ gas line 356 from the manifold 354 to a regulator 358 on a $CO_2$ tank 360. Preferably, the female coupling member 308 is threaded to the manifold such that the male coupling member 306 and the $CO_2$ gas line 350 attached thereto may be readily disconnected to enable the keg or barrel to be readily replaced. In addition, the two-way uncoupling valve assembly enables the $CO_2$ gas line 350 to be readily shut off or turned on. Further, in this particular type of application, the two-way uncoupling valve assembly will most likely include the check valve 328 to prevent $CO_2$ gas backflow. It will be appreciated; however, that a separate check valve might be utilized downstream from the two-way uncoupling valve assembly. The check valve 328 will prevent the system from being damaged should unusually high pressure build up at the keg or barrel 352. The two-way uncoupling valve assembly 300 at the $CO_2$ tank 360 will enable the $CO_2$ tank 360 to be readily replaced when empty. Further, the check valve 328 will enable line pressure to be maintained, typically about 2 psi, while the $CO_2$ tank is being changed. Once again, however, the check valve might be located somewhere downstream of the two-way uncoupling valve assembly.

It will be appreciated that in this application, the uncoupling valve assembly 300, is used only in the $CO_2$ gas lines and not in the liquid beverage lines. The present invention might be similarly used in a wine dispensing system wherein nitrogen is used as the pressurized gas. It will be further appreciated that in other applications the present invention might be used in lines conveying either gases or liquids.

Figure 30:
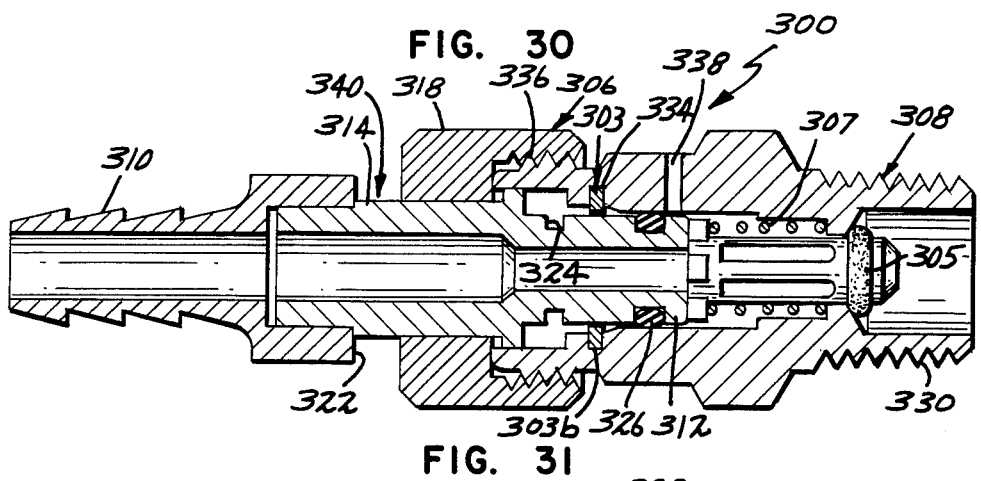
FIG. 30 is a sectional view of an alternate embodiment of the present invention as seen generally along line 30—30 in FIG. 29; and, FIG. 31 is a diagrammatic view illustrating use of the present invention with a beverage dispensing system.

In certain embodiments of the present invention, as illustrated in FIG. 30, the female coupling member 308, will include an aperture or exhaust port 338 radially extending from the inner bore of the female coupling member 308 to the embient atmosphere. The exhaust port will be positioned upstream from the O-ring 326 when the valve assembly 304 is in a closed position and roughly in radial alignment with the O-ring 326 when the valve assembly 304 is in an open position. When the exhaust port 338 is utilized, the check valve 328 will typically not be used. The exhaust port 338 enables the two-way uncoupling valve assembly to function as a three-way valve wherein venting of downstream pressure is provided. This particular combination is particularly advantageous in that it enables the two-way uncoupling valve assembly to bleed off any gas pressure in the line so as to return the fluid line and its associated equipment to a relaxed status.

In the preferred embodiment, the male coupling member 306 and the female coupling member 308 are made from brass, while the threaded nut 318 is made from aluminum. This enables the aluminum to be anodized for color coding such that the fluid content of the lines can be readily identified. Also in the preferred embodiment the nut 318 is knurled. Furthermore, in yet another embodiment of the present invention, a colored band might be positioned about the second tubular portion 314 at a location 340 between the shoulder surface 322 and the collar 320 such that the color band 340 appears when the two-way uncoupling valve assembly is shut off and disappears when the two-way uncoupling valve assembly 300 is turned on as generally illustrated in FIGS. 28 and 29, respectively. Accordingly, by merely glancing at the valve assembly 300, the user can tell whether or not fluid flow is enabled. Another application of the color coding might be to color code the manifold of the beverage dispensing system in the same manner such that the fluid lines can be properly matched with the manifold. A preferable color of the color band or orange.

In the embodiment shown, the check valve 328 is made from an elastomeric material and includes a cylindrical base 328a and two upstream projecting members 328b. The base is fixedly retained by pinching the base between the barbed portion 310 and the downstream end of the second tubular portion 314. It will be appreciated that other types of check valve configurations might be utilized. Furthermore, the two-way uncoupling valve assembly 300 of the present invention will in certain applications be utilized without the check valve 328 such as when the check valve is located downstream from the two-way uncoupling valve assembly 300 or the exhaust port 338 is utilized. In addition, the two-way uncoupling valve assembly 300 might be utilized with a number of other different functional elements as a part of the valve.

In use, the two-way uncoupling valve assembly 300 is interconnected into the fluid line by suitably attaching the barbed portion 310 to a fluid line and the female coupling member 308 to some line equipment such as a manifold or a regulator, etc. To connect the male coupling member 306 to the female coupling member 308, the first tubular portion 312 is inserted into the bore of the female coupling member 308 until the threaded nut 318 makes contact with the threaded portion 336. It will be noted, that one particular advantageous feature of the preferred embodiment is that the threaded nut 318 and the threaded portion 336 cooperate to prevent the male coupling member 306 from being inserted sufficiently far into the female coupling member 308 to move the valve assembly 304 in an upstream direction and thereby open the fluid line prior to threading the nut 318 onto the threaded portion 336. The threaded nut 318 is then threaded onto the threaded portion 336, the two-way uncoupling valve assembly 300 being at this point in a coupled, but shut off state. Once the threaded nut 318 has been completely threaded onto the threaded portion 336, the male coupling member 306 is forced by the user axially longitudinally upstream such that the first tubular portion 312 engages the downstream or front end of the valve assembly 304 and moves the valve assembly into the open position such that fluid flow is enabled. Once the male coupling member 306 is moved upstream to a point where the locking pin assembly 309 of the locking mechanism 302 is engaged by the collar portion 320, the locking pin assembly 309 will be forced toward the back end of the female coupling member 308. Accordingly, the collar 303 of the locking mechanism 302 will be released and forced upward by the spring 311 to engage the groove 324 to retain the two-way uncoupling valve assembly 300 in the open position.

It will be appreciated that the threaded nut 318 must be nearly completely threaded onto the threaded portion 336 to enable the first tubular portion 312 to be moved far enough upstream such that the locking mechanism 302 is activated. (See the detailed description of the function of the locking mechanism as described in connection with FIGS. 1 through 3.) Once the two-way uncoupling valve assembly 300 is locked in an on position and the fluid flow enabled, inadvertent shut off or deactivation of the locking mechanism 302 can be eliminated by backing the threaded nut 318 off such that its downstream shoulder engages the shoulder 322 of the barbed portion 310 as illustrated in FIG. 1 by the broken line 318a. Once the threaded nut 318 is forced against the shoulders 322, the locking mechanism cannot be deactivated by pushing down on the collar portion 303a since the threaded nut 318 is forcing the male coupling member 306 in the downstream direction relative to the female coupling member 308 such that the plate portion 302b is wedged in the groove 324. Accordingly, inadvertently pressing against the locking mechanism 302 will not cause the two-way uncoupling valve assembly 300 to be inadvertently shut off. It will be appreciated that in order to disconnect the two-way uncoupling valve assembly 300, the valve assembly 300 must be first shut off by pressing down on the locking collar portion 303a of the locking mechanism 302 so as to release the first tubular portion 312 of the male coupling member 306 which is then forced in a downstream direction by the biasing action of a spring 307 of the valve assembly 304. Accordingly, the valve assembly 304 is moved downstream into a closed position wherein an O-ring 305 at the back end thereof provides a seal on the inside of the female coupling member 308. Thus the two-way uncoupling valve assembly 300 is readily switched on and off by simply forcing upstream on the male coupling member and pressing radially inward on the collar portion 303a, respectively. In order to disconnect the two-way uncoupling valve assembly 300, the valve assembly 300 must be in an off condition such that the threaded nut 318 can be unthreaded from the threaded portion 336. Therefore, another significant advantage of the preferred embodiment of the present invention, is the requirement that the two-way uncoupling valve assembly 300 be shut off before it is disconnected.

Further, since the threaded nut is rotatably positioned on the second tubular portion 314, the male coupling member 306 can be twisted or swiveled relative to the female coupling member 308 whether the uncoupling valve assembly 300 is in an open or closed position. Accordingly, the lines interconnected by the uncoupling valve assembly do not become snarled.

The present invention provides for the combination of an on/off two-way valve function and an automatic shut off quick disconnect in one mechanism. Various embodiments of the present invention will incorporate other functions such as a flow control check valve restricting flow in one direction or an exhaust port for purging the downstream fluid line pressure. The present invention offers significant advantages to the market place by combining these functions into one mechanism, having relatively small package size, ease of use, reduced cost, etc. Various embodiments of the present invention offer yet other advantages such as color coding enabling specific line identification and status, flow control valve function, line pressure stabilization, etc. Accordingly, the present invention provides a very safe, economical, and easy to use mechanism incorporating features previously implemented via separate independent mechanisms at various locations in the fluid line.

It should be understood, however, that even though these numerous characteristics and advantages of the invention have been set forth in the foregoing description, together with details of the structure and function of the invention, the disclosure is illustrative only, and changes may be made in detail, especially in matters of shape, size and arrangement of parts within the principal of the invention to the full extent indicated by the broad general meaning of the terms in which the appended claims are expressed.

What is claimed is:

1. A two-way uncoupling valve assembly for use in a fluid line, the flow of fluid generally being in a downstream direction, the coupling assembly comprising:
    (a) a female coupling member having a front end and a back end, said female coupling member defining a path for the flow of fluid therethrough;
    (b) a male coupling member having a front end and a back end and defining a path for the flow of fluid therethrough, the front end of said male coupling member facing the front end of said female coupling member, said male coupling member including a hollow tubular portion, said tubular portion being constructed and arranged for removable insertion into the front end of said female coupling member, said female coupling member defining an axial tubular bore within which said tubular portion of said male coupling member is concentrically received, said tubular portion of said male coupling member including a seal about its circumference for providing a fluid-tight seal between the outside surface on said tubular portion and the inside surface of said tubular bore of said female coupling member upon insertion of said male coupling member into said female coupling member;
    (c) a valve assembly adapted for reciprocating longitudinal axial movement within the tubular bore of said female coupling member between a front end position and a back end position, said valve assembly being constructed and arranged for engaging said male coupling member upon insertion of said male coupling member into said female coupling member a predetermined distance whereby said valve assembly is caused to move toward the back end of said female coupling member into said back end position thereby enabling fluid flow from said male coupling member through said female coupling member, said valve assembly including means for sealing off the fluid flow path through said female coupling member when said valve assembly is in said front end position;
    (d) locking means proximate the front end of said female coupling member for releasably locking said male coupling member in said female coupling member when said valve assembly is in said back end position, said locking means being activated upon insertion of said male coupling member a predetermined distance into said female coupling member;
    (e) release means interconnected to said locking means for deactivating said locking means whereby said male coupling member is released by said locking means;
    (f) biasing means adapted for biasing said valve assembly toward the front end of said female coupling member into said front end position whereby when said male coupling member is released by deactivating said locking means, said valve assembly is biased into said front end position forcing said male coupling member in a downstream direction and preventing the flow of fluid through said female coupling member; and
    (g) threaded coupling means for removably coupling said male coupling member to said female coupling member in a coupled state, said threaded coupling means enabling axial movement of said male coupling member to provide for axial movement of said valve assembly within said female coupling member between said back end position and said front end position while in said coupled state.

2. A two-way uncoupling valve assembly in accordance with claim 1, wherein said release means includes a lever interconnected to said locking means, said lever deactivating said locking means upon application of a force radially directed toward the longitudinal axis of the coupling assembly.

3. A two-way uncoupling valve assembly in accordance with claim 1, wherein said male coupling member includes a groove at least partially about the circumference thereof, said groove cooperating with said locking means to releasably retain said male coupling member and said female coupling member in said coupled state.

4. A two-way uncoupling valve assembly in accordance with claim 1, wherein said means for sealing off the fluid flow path through said female coupling member when said valve assembly is in said front end position includes an O-ring seal abutting against a projection into the bore of the female coupling member.

5. A two-way uncoupling valve assembly in accordance with claim 1, said threaded coupling means including a threaded collar portion adjacent said front end of said female coupling member and a threaded nut portion slideably retained on said male coupling member, said threaded nut portion and said threaded collar portion cooperating to removably connect said female coupling member to said male coupling member.

6. A two-way uncoupling valve assembly in accordance with claim 1, wherein said male coupling member includes check valve means proximate the back end for preventing the back flow of fluid.

7. A two-way uncoupling valve assembly in accordance with claim 6, wherein said check valve means includes a duck bill valve apparatus fixedly secured in the male coupling member.

8. A two-way uncoupling valve assembly in accordance with claim 1, wherein said two-way uncoupling valve assembly includes indicia indicating when fluid flow is enabled or prohibited, said indicia including a colored band about said male coupling member.

9. A two-way uncoupling valve assembly in accordance with claim 1, wherein said two-way uncoupling valve assembly includes pressure exhaust means for exhausting off downstream pressure.

10. A two-way uncoupling valve assembly in accordance with claim 9, wherein said exhaust means includes an aperture in said female coupling member upstream from said seal of said tubular portion when said valve assembly is in said front end position, said aperture being in communication with the axial fluid flow path of said female coupling member and the ambient atmosphere, said aperture being closed by said seal when said valve assembly is in said back end position.

11. A two-way uncoupling valve assembly in accordance with claim 5, said threaded coupling means constructed and arranged to prohibit under operator control release of said locking means whereby accidental release of the locking mechanism is prohibited, thereby assuring that fluid flow is not accidentally shut off.

12. A two-way uncoupling valve assembly in accordance with claim 1, said threaded coupling means constructed and arranged to prevent activation of said locking means until said male coupling member and said female coupling member are securely connected.

13. A two-way uncoupling valve assembly in accordance with claim 11, wherein said threaded nut forces against a shoulder portion of said male coupling member upon being backed away from said locking means after said locking means has been activated, said threaded nut forcing said male coupling member away from said female coupling member thereby securedly wedging said locking means in the activated position.

14. A two-way uncoupling valve assembly in accordance with claim 12, wherein said threaded nut is constructed and arranged such that the threaded nut must be substantially threaded onto said threaded portion of said female coupling member before said male coupling member can be forced sufficiently far into said female coupling member to enable said locking means to be activated.

15. A two-way uncoupling valve assembly in accordance with claim 1, wherein said female coupling member and said male coupling member are made from a brass material.

16. A two-way uncoupling valve assembly in accordance with claim 15, wherein said threaded nut is made from an aluminum material.

17. A two-way uncoupling valve assembly for use in a fluid line, the folow of fluid generally being in a downstream direction, the coupling assembly comprising:
  (a) a female coupling member having a front end and a back end, said female coupling member defining a path for the flow of fluid therethrough;
  (b) a male coupling member having a front end and a back end and defining a path for the flow of fluid therethrough, said male coupling member including a first tubular portion proximate the front end and a second tubular portion proximate the back end, said first tubular portion being constructed and arranged for removable insertion into the front end of said female coupling member, said female coupling member defining an axial tubular bore for concentrically receiving said first tubular portion, said first tubular portion including a seal about its circumference near the front end thereof for providing a fluid type seal between the outside surface of said first tubular portion and the inside surface of said tubular bore of said female coupling member upon insertion of said first tubular portion into said tubular bore;
  (c) coupling means including a threaded nut member slideably mounted on said second tubular portion of said male coupling member and an axially extending threaded portion proximate the front end of said female coupling member for removably coupling said male coupling member to said female coupling member in a coupled state, said coupling means enabling said first tubular portion of said male coupling member to be slideably positioned in said female coupling member for movement between a first position and a second position while in said coupled state, said male coupling member including stop means proximate the front and back ends of said second tubular portion for limiting the axial movement of said threaded nut member along said second tubular portion;
  (d) a valve assembly adapted for reciprocating longitudinal axial movement within said female coupling member between a closed position wherein fluid flow is prohibited and an open position wherein fluid flow is enabled, said valve assembly being constructed and arranged for engaging said male coupling member upon insertion of said male coupling member into said female coupling member beyond a predetermined distance, said first tubular portion causing said valve assembly to move into said open position upon movement of said first tubular portion into said first position and further causing said valve assembly to move into said closed position upon movement of said first tubular portion into said second position;
  (e) a locking means mounted on said female coupling member for releasably locking said male coupling member in position when said valve assembly is in said open position;
  (f) spring biasing means adapted for biasing said valve assembly into the closed position; and
  (g) release means interconnected with said locking means for deactivating said locking means, whereby said valve assembly is forced into said closed position by said spring biasing means, said valve assembly forcing said first tubular portion of said male coupling member into said second position.

18. A two-way uncoupling valve assembly for use in a fluid line, the flow of fluid generally being in a downstream direction, the coupling assembly comprising:
  (a) a female coupling member having a front: end and a back end, said female coupling member defining a fluid flow path for the flow of fluid therethrough, said fluid flow path including an axially directed tubular bore proximate the front end of said female coupling member, said female coupling member including a valve assembly adapted for reciprocating longitudinal axial movement within said female coupling member between a front end position and a back end position, said valve assembly including seal means for sealing off the fluid flow path through said female coupling member when said valve assembly is in said front end position, said valve assembly being configured to enable fluid flow through said female coupling member when in said back end position, said valve assembly including biasing means for biasing said valve assembly into said front end position, said female coupling member further including an axially directed threaded portion proximate the front end thereof;
  (b) a male coupling member having a front end and a back end, the front end of said male coupling member facing the front end of said female coupling member, said male coupling member defining a path for the flow of fluid therethrough, said male coupling member including a first hollow tubular portion proximate the front end thereof and a second hollow tubular portion downstream from said first hollow tubular portion, said first hollow tubular portion being constructed and arranged for being slideably and concentrically received by said axially directed tubular bore of said female coupling member, said first tubular portion including a seal about its circumference providing a fluid-tight seal between said first tubular portion and said axially directed bore of said female coupling member;
  (c) a threaded nut member interconnected to said male coupling member, said threaded nut member cooperating with said threaded portion of said female coupling member to enable said male coupling member to be removably connected to said female coupling member in a connected state, said threaded nut member being slideably mounted on said second tubular portion to enable axial movement of said male coupling member when in said connected state with said female coupling member, said male coupling member including stop means for cooperating with said threaded nut member to limit axial movement of said male coupling member between first and second positions when in said connected state with said female coupling member, said tubular portion of said male coupling member engaging and forcing said valve assembly of said female coupling member into said back end position when in said first position whereby fluid flow is enabled;

(d) locking means mounted on said female coupling member for releasably locking said male coupling member in said first position; and (e) release means for releasing said locking means, said biasing means cooperating with said valve means to force said male coupling member towards said second position upon release of said locking means, whereby said valve assembly is moved into said front end position, thereby shutting off the flow of fluid.

* * * * *

UNITED STATES PATENT AND TRADEMARK OFFICE
CERTIFICATE OF CORRECTION

PATENT NO. : 4,541,457

DATED : September 17, 1985

INVENTOR(S) : Brian J. Blenkush

It is certified that error appears in the above-identified patent and that said Letters Patent is hereby corrected as shown below:

Column 2, line 5, "it" should be --its--;

Column 5, line 52, delete "is";

Column 5, line 67, "collarlike" should be --collar-like--;

Column 6, line 61, "extend" should be --extent--;

Column 9, line 26, "andd" should be --and--;

Column 9, line 45, "ito" should be --into--;

Column 11, line 41, "extend" should be --extent--;

Column 11, line 43, "genearlly" should be --generally--;

Column 13, line 16, "distored" should be --distorted--;

Column 13, line 32, "onto" should be --into--;

Column 14, line 11, "a" (first occurence) should be --an--;

UNITED STATES PATENT AND TRADEMARK OFFICE
CERTIFICATE OF CORRECTION

PATENT NO. : 4,541,457

DATED : September 17, 1985

INVENTOR(S) : Brian J. Blenkush

It is certified that error appears in the above-identified patent and that said Letters Patent is hereby corrected as shown below:

Column 15, line 63, "roughtly" should be --roughly--;

Column 17, line 8, "or" should be --is--;

Column 21, line 28, "folow" should be --flow--;

Column 22, line 29, "front:" should be --front--;

Signed and Sealed this

Twenty-first Day of October, 1986

[SEAL]

*Attest:*

DONALD J. QUIGG

*Attesting Officer*      *Commissioner of Patents and Trademarks*